United States Patent [19]

Okamori

[11] Patent Number: 4,958,069

[45] Date of Patent: Sep. 18, 1990

[54] APPARATUS FOR DETECTING PRESENCE OR ABSENCE OF RECORDING MEDIUM IN PRINTER

[75] Inventor: Shuhei Okamori, Nagoya, Japan

[73] Assignee: Brother Kogyo Kabushiki Kaisha, Aichi, Japan

[21] Appl. No.: 367,959

[22] Filed: Jun. 19, 1989

[30] Foreign Application Priority Data

Jun. 22, 1988 [JP] Japan ................................ 63-154056

[51] Int. Cl.[5] ................................................ G01N 9/04

[52] U.S. Cl. ................................. 250/223 R; 250/561

[58] Field of Search ............. 250/223 R, 561; 355/41, 355/309, 316, 317

[56] References Cited

U.S. PATENT DOCUMENTS

| | | | |
|---|---|---|---|
| 4,484,070 | 11/1984 | Inoue | 250/223 R |
| 4,571,055 | 2/1986 | Nishiyama . | |
| 4,639,607 | 1/1987 | Brandner | 250/223 R |
| 4,641,272 | 2/1987 | Sasaki et al. | 250/561 |
| 4,650,991 | 3/1987 | Croset et al. | 250/223 R |
| 4,667,113 | 5/1987 | Nakajima et al. | 250/561 |
| 4,727,437 | 2/1988 | Mizoguchi | 358/304 |

FOREIGN PATENT DOCUMENTS

| | | | |
|---|---|---|---|
| 0033167 | 8/1981 | European Pat. Off. . | |
| 2047881 | 12/1980 | United Kingdom . | |
| 2165045 | 4/1986 | United Kingdom . | |

*Primary Examiner*—David C. Nelms
*Assistant Examiner*—Que Tan Le
*Attorney, Agent, or Firm*—Oliff & Berridge

[57] ABSTRACT

An apparatus for detecting the presence or absence of a recording medium in a printer includes a photo-electric sensor, a reference determining device, a memory, and a judging device. The photo-electric sensor is disposed adjacent to a predetermined position in a feeding path of the printer. In a reference setting mode, the reference determining device determines a reference based on an output signal generated by the photo-electric sensor. The determined reference is stored in the memory. In a printing mode, the judging device compares the output signal of the photo-electric sensor with the reference, and judges whether or not the recording medium is present at the predetermined position.

7 Claims, 4 Drawing Sheets

APPARATUS FOR DETECTING PRESENCE OR ABSENCE OF RECORDING MEDIUM IN PRINTER

BACKGROUND OF THE INVENTION

1. Field of the Invention

The present invention relates to an apparatus for detecting the presence or the absence of a recording medium in a printer.

2. Discussion of the Prior Art

There is known an apparatus for detecting the presence or the absence of a recording medium in a printer, which has a photo-electric sensor 4 disposed as shown in FIG. 2 such that the photo-electric sensor 4 faces a platen 2 which partially defines a feeding path for the recording medium in the form of a recording sheet 6. In this apparatus, the photo-electric sensor 4 generates a first output signal when the recording sheet 6 has not been fed to the platen 2, that is, when the recording sheet is absent at a printing position in the printer On the other hand, when the recording sheet 6 has been fed into position along the platen 2 by a known feeding system (not shown) such as a motor and a feed roller, that is, when the recording sheet 6 is present at the printing position, the photo-electric sensor 4 generates a second output signal.

Further, in the known apparatus for detecting the presence or absence of a recording medium, the photo-electric sensor 4 consists of a light emitting diode 4*a* and a photo-transistor 4*b*, as indicated in FIG. 3. The light emitting diode 4*a* is arranged so as to emit light toward the platen 2, and the photo-transistor 4*b* is positioned so as to receive the light reflected from the platen 2. The photo-transistor 4*b* supplies the first or second output signal to a comparator-detector circuit 8, which compares received output signal with a reference level, and detects the presence or the absence of the recording sheet 6 at the printing position, based on whether the level of the output signal is higher than the reference level.

In the known apparatus as described above, when the recording sheet 6 is absent at the printing position, the level of the first output signal of the photo-transistor 4*b* which corresponds to the absence of the recording sheet 6 is lower than the reference level with which the first output signal is compared by the comparator-detector circuit 8. Thus, the comparator-detector circuit 8 generates a signal indicative of the absence of the recording sheet 6 at the printing position. On the contrary, the level of the second output signal of the photo-transistor 4*b* corresponding to the presence of the recording sheet 6 is higher than the reference level The comparator-detector circuit 8 generates a signal indicative of the presence of the recording sheet 6 at the printing position.

The levels of the first and second output signals unavoidably vary or fluctuate due to a variation in the sensitivity of the photo-electric sensor 4, that is, chronological variations in the light intensity of the light emitting diode 4*a* and sensitivity of the photo-transistor 4*b*, and a time-wise or chronological variation in the reflectance of light of the surface of the platen 2. Further, the individual photo-electric sensors 4 for the individual printers have different sensitivities, due to the manufacturing errors from the nominal ratings. Also, there exists an inevitable error in the relative position of the photo-electric sensor 4 and the platen 2. Since these variations and errors cannot be ignored in assuring an accurate detection of the presence or absence of the recording medium, there has been proposed to limit the color of the recording sheet, or to provide the comparator-detector circuit 8 with a semi-fixed resistor 10, for adjusting the reference level, so as to minimize disadvantages caused by the above-indicated errors and variations, namely, to improve the detecting accuracy of the detecting apparatus.

In the case where the color of the recording sheet is limited as proposed above, however, the accurate detection is difficult when the recording sheet has images already printed thereon. In the case where the semi-fixed resistor 10 is used, the maximum amount of adjustment of electrical resistance of the resistor 10 cannot provide a sufficient amount of adjustment of the reference level, which covers the entire range of variations in the sensitivity of the photo-electric sensor 4 which may be three times as large as the adjustable range of the semi-fixed resistor 10.

SUMMARY OF THE INVENTION.

The present invention has been developed in view of the above situation in the prior art. It is an object of the present invention to provide an apparatus for detecting the presence or absence of a recording medium in a printer, which apparatus does not require the conventional limitation in the color of the recording medium and is able to perform accurate detection of the presence or absence of the recording medium, even if the range of variation in the sensitivity of a photo-electric sensor is considerably large.

The above object may be achieved by the present invention, which provides an apparatus for detecting the presence or absence of a recording medium in a printer in which the recording medium is fed along a feeding path, the apparatus comprising: a .photo-electric sensor disposed adjacent to a predetermined position in the feeding path of the printer; reference determining means for determining a reference based on an output signal generated by the photo-electric sensor in a reference setting mode, the reference being determined when the recording medium is either present or absent at the predetermined position; memory means for storing the reference determined by the reference determining means; and judging means for comparing the output signal of the photo-electric sensor with the reference in a normal operation mode, and for judging whether or not the recording medium is present at the predetermined position.

According to the present invention, the output signal which is generated by the photo-electric sensor, while the printer is placed in the reference setting mode, reflects or changes with the optical characteristics at the predetermined position such as reflectance or transmissivity of light at the predetermined position, the variation in sensitivity of the photo-electric sensor, and relative positioning error of the platen and the photo-electric sensor. The reference is determined based on this output signal of the sensor. Thus, the detection of the presence or absence of the recording medium at the predetermined position in the printer is free from influences of the change in the optical characteristics at the predetermined position, and the above-indicated error or variation associated with the sensor, whereby the presence or absence of the recording medium at the predetermined position can be accurately detected.

In the apparatus of the present invention as described above, the reference determining means preferably determines the reference based on the output signal generated by the photo-electric sensor in the reference setting mode when the recording medium is absent at the predetermined position. It is also possible that the reference is determined by the reference determining means based on the output signal generated when the recording medium is present at the predetermined position.

The photo-electric sensor may include a light emitting element which emits the light toward the predetermined position, and a light receiving element which receives the light reflected from the predetermined position and generates the output signal corresponding to the intensity of the received light. In this case, the predetermined position may be provided on a support member which supports the recording medium, and the light emitting element emits the light toward the predetermined position on the support member. A surface of the support member may have a lower reflectance of light than that of the recording medium. In this case the reference determining means determines the reference such that the determined reference level is higher than the level of the output signal generated by the light receiving element when the recording medium is absent at the predetermined position. On the other hand, in the case where the reference determining means determines the reference based on the output signal corresponding to the presence of the recording medium at the predetermined position, the reference is determined such that the level of the reference is lower than the level of the output signal.

Further, it is also possible that the light receiving element of the photo-electric sensor receives light which has passed through the predetermined position. In this instance, when the reference determining means determines the reference based on the output signal corresponding to the absence of the recording medium at the predetermined position, the reference is determined such that the level of the reference is lower than the level of the output signal. On the other hand, in the case where the reference determining means determines the reference based on the output signal corresponding to presence of the recording medium at the predetermined position, the reference is determined such that the level the reference is higher than the level of the output signal.

The reference determining means may determine the reference by multiplying the level of the output signal of the photo-electric sensor by $(1+\alpha)$, wherein $\alpha$ is smaller than 1. Because of this determination, the larger the output signal is the larger a difference between the output signal and the reference is provided. Thus, the variation in the output signal is advantageously absorbed by the difference.

Further, in the apparatus of the present invention as described above, the support means may be a feed roller which rotates while supporting the recording medium. In this case, the reference determining means may comprise means for rotating the feed roller at least one turn in the reference setting mode, and determines the reference based on a maximum output signal of the photo-electric sensor generated while the feed roller is rotated.

The reference determining means, memory means and judging means may be constituted by a computer which is connected to the photo-electric sensor via an A/D converter.

The apparatus of the present invention may further have switch means for placing the printer either in the reference setting mode or in the normal operation mode. In this case, the reference determining means may determine the reference when the printer is placed in the reference setting mode. The switch means may include an operation member which is operated by an operator.

The above object may also be achieved according to another aspect of the present invention, which provides an apparatus for detecting the presence or the absence of a recording medium in a printer in which the recording medium is fed along a feeding path, the apparatus comprising: a photo-electric sensor which is disposed close to a printing position in the feeding path; an A/D converter connected to the photo-electric sensor for converting an output signal of the photo-electric sensor into a digital output signal; reference determining means for determining a reference based on the digital output signal supplied from the A/D converter in a reference setting mode, the reference being determined when the recording medium is absent at the printing position; memory means for storing the reference determined by the reference determining means; and judging means for comparing the digital output signal generated in a normal operation mode with the reference stored in the memory means, and for judging whether or not the recording medium is present at the printing position.

In the present apparatus according to the present invention, the photo-electric sensor applies to the A/D converter the output signal which corresponds to the absence of the recording medium at the predetermined position while the printer is placed in the reference setting mode. The A/D converter converts the output signal into the digital output signal and supplies it to the reference determining means. The reference determining means determines the reference based on the digital output signal in the reference setting mode. The determined reference is then stored in the memory means. Subsequently, the judging means compares the digital output signal supplied from the A/D converter generated in the normal operation mode with the stored reference, and thereby judges whether the recording medium is present or absent at the predetermined position.

BRIEF DESCRIPTION OF THE DRAWINGS

The foregoing and other objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
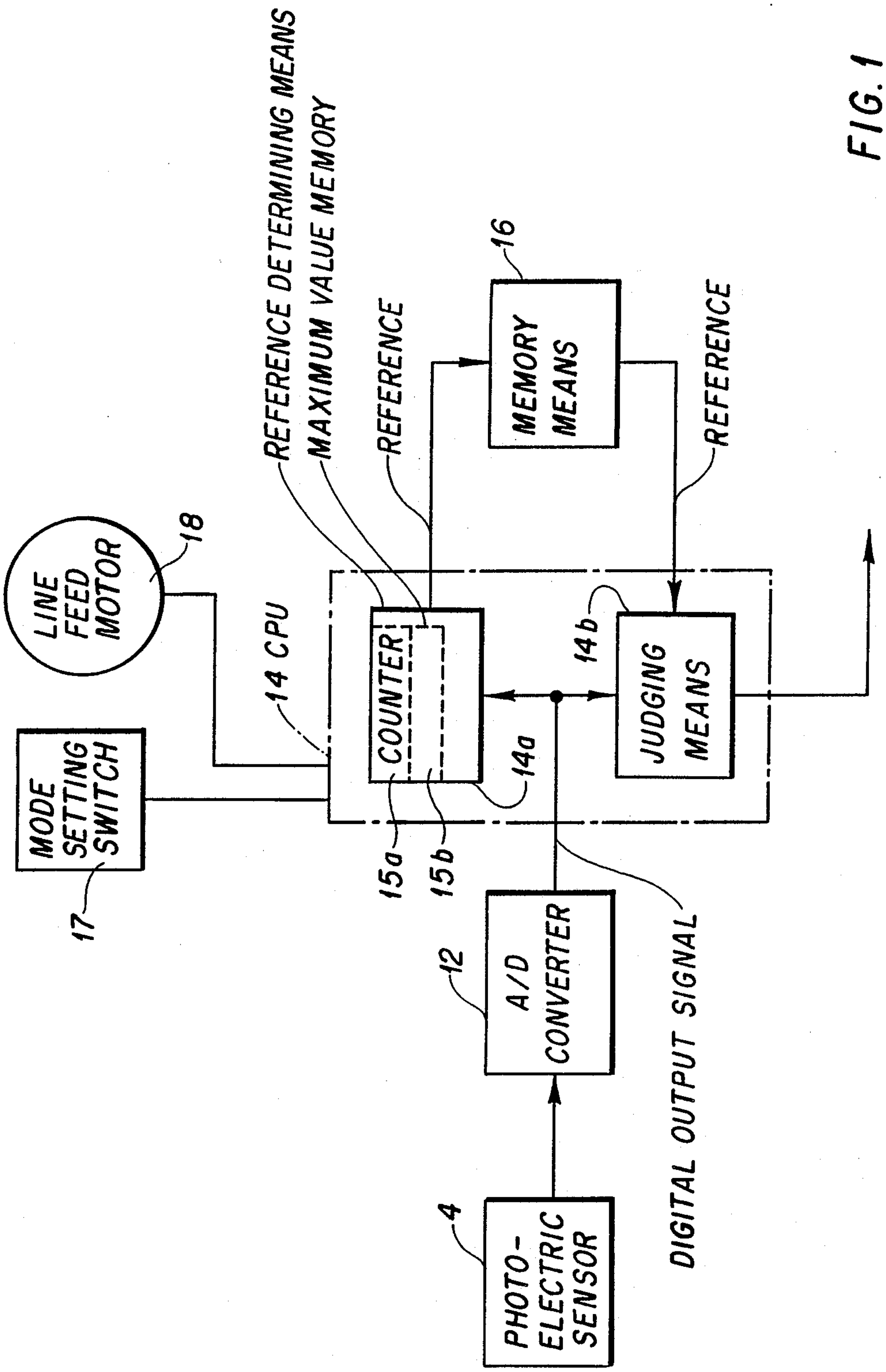
FIG. 1 is a block diagram illustrating an electric circuit of one embodiment of an apparatus of the present invention for detecting the presence or absence of a recording medium in a printer.
Figure 2:
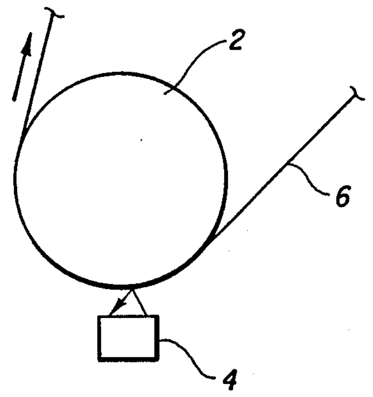
FIG. 2 is a view illustrating relative positions of a platen, a recording sheet and a photo-electric sensor as viewed in an axial direction of the platen.
Figure 3:
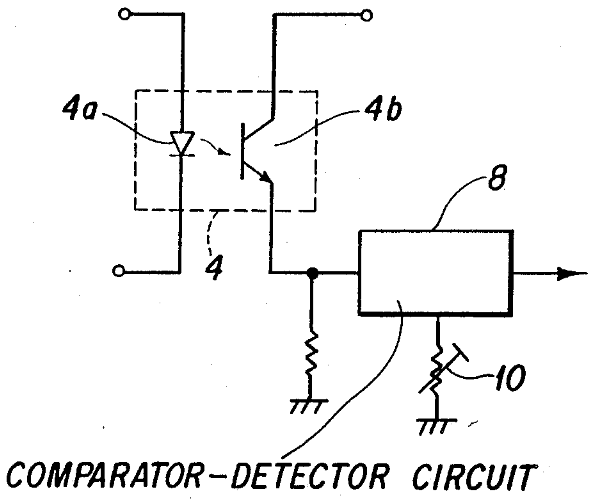
FIG. 3 is a view illustrating an electric circuit of the conventional apparatus for detecting the presence or absence of a recording medium.

Referring to FIGS. 1 and 2, the apparatus includes a photo-electric sensor 4 which has a similar construction as the conventional photo-electric sensor shown in FIG. 3. The sensor 4 is disposed near a platen 2 which partially defines a feeding path for the recording medium in the form of a recording sheet 6 as shown in FIG. 2. The photo-electric sensor 4 is adapted to generate a first output signal when the recording medium is absent at a predetermined position such as a printing position, while the printer is placed in a reference setting mode. The present apparatus has an A/D converter 12 for converting the output signal generated from the photo-electric sensor 4 into a digital output signal, a CPU 14 and memory means 16. The CPU 14 includes reference determining means 14*a* and judging means 14*b*, and is connected to a mode setting switch 17 which places the printer either in the reference setting mode or a normal operation mode. The reference determining means 14*a* includes a counter 15*a* and a maximum value memory 15*b* which will be described below, and determines a reference value based on the digital output signal supplied from the A/D converter 12 while the printer is placed in the reference setting mode. This digital output signal corresponds to the absence of the recording sheet 6 at the predetermined position. The memory means 16 consists of an EEPROM, a RAM with a backup battery, and other elements, and stores the reference value determined by the reference determining means 14*a* of the CPU 14. Digital output signals are also supplied from the A/D converter 12 while the printer is in a printing operation, that is, placed in the normal operation mode. The judging means 14*b* compares the values of these digital output signals with the reference value stored in the memory means 16, and judges whether the recording sheet 6 is present or absent at the predetermined position.

Figure 4:
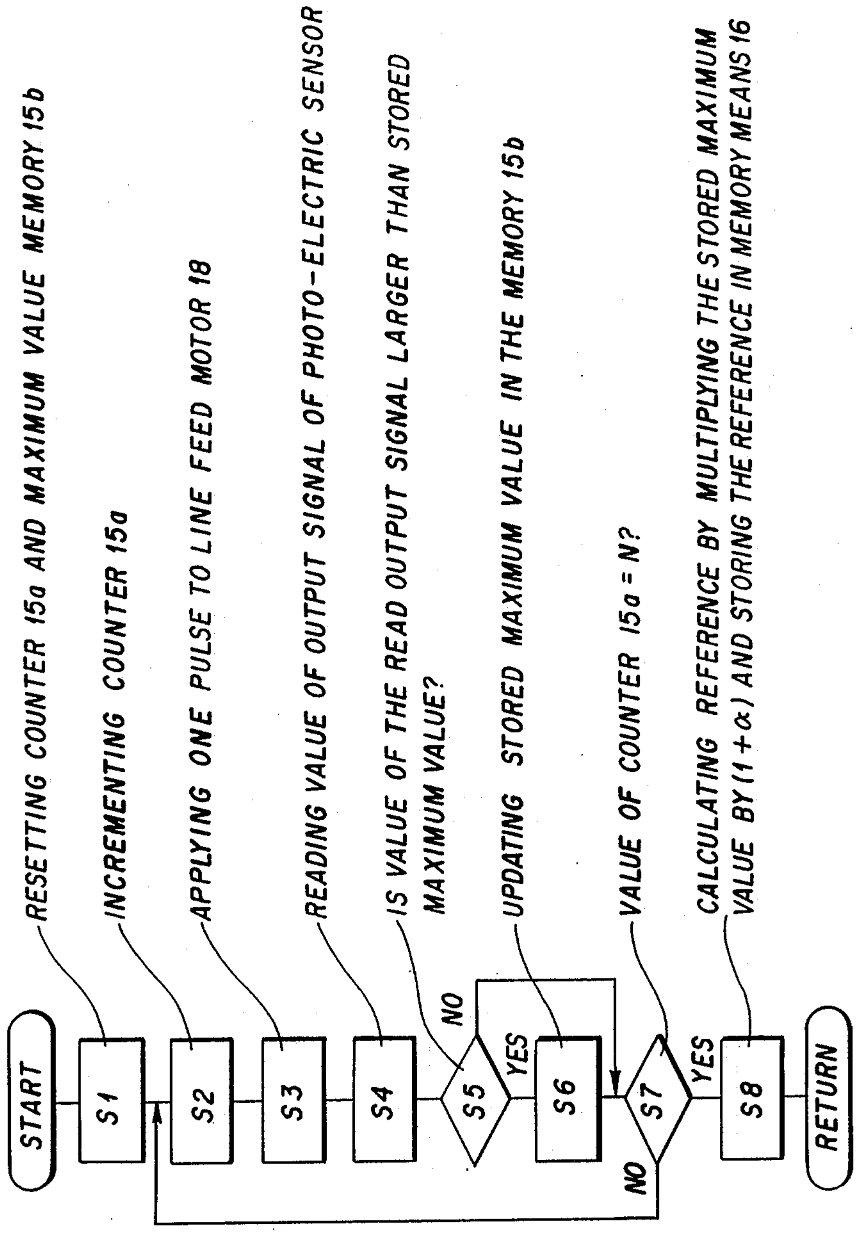
FIG. 4 is a flow chart illustrating the determination of a maximum value of the output signals and the determination of a reference.

The above-mentioned determination of the reference will be described in detail below. Upon receiving a predetermined command signal from an external device when the recording medium is absent at the predetermined position, or upon operation of the mode setting switch 17, the printer is set into the reference setting mode. In this reference setting mode, the CPU 14 commands a line feed motor 18 to rotate the platen 2 at least one turn, and selects a maximum value of the values of the digital output signals supplied from the A/D converter 12 while the platen 2 is rotated. The thus selected digital output signal is supplied to the reference determining means 14*a* for the determination of the reference value. This selection of the maximum value and the determination of the reference is effected by the CPU 14 according to a program which is shown in the flow chart in FIG. 4. Initially, in step S1, the counter 15*a* and the maximum value memory 15*b* are reset. Subsequently, step S2 is effected to increment the counter 5*a*. Step S2 is followed by step S3 in which one stepping pulse is applied to the line feed motor 18 so as to rotate the platen 2. While the platen 2 is rotated, the photo-electric sensor 4 emits light toward the predetermined position, and receives the reflected light from the predetermined position. Then the photo-electric sensor 4 generates an output signal which corresponds to the intensity of the received light. In step S4, the value of the output signal generated from the photo-electric sensor 4 is read in. Step S4 is followed by step S5 to determine whether or not the value of the read output signal is larger than a maximum value stored in the maximum value memory 15*b*. If the determination is affirmative, that is, if the value of the read output signal is larger than the stored maximum value, the value of the read output signal is stored in the maximum value memory 15*b* to update the stored maximum value. On the other hand, if the determination is negative, that is, if the value of the read output signal is smaller than the stored maximum value, the value of the read output signal is not stored in the maximum value memory 15*b*. In the first control cycle, however, no maximum value has been stored in the maximum value memory 15*b*, that is, the stored maximum value is zero. Therefore, the determination in step S5 is affirmative. Thus, step S5 is followed by step S6 in which the value of the output signal is stored, as a maximum value, in the maximum value memory 15*b*. Subsequently, step S7 is effected to determine whether the value of the counter 15*a*, that is, whether the number of pulse which has been applied to the line feed motor 18, has become equal to N. The number N represents the number of pulses required for rotating the platen 2 by one turn. If the determination in step S7 is negative, that is, if the count of the counter 15*a* has not reached N, the control flow goes back to step S2, and steps 2–7 are repeated until the count become N. If the determination in step S7 is affirmative, that is, if the count has reached N, step S7 is followed by step S8 in which the reference is calculated by multiplying the maximum value stored in the maximum value memory 15*b*, by $(1+\alpha)$, and the thus calculated reference is stored in the memory means 16.

Figure 5:
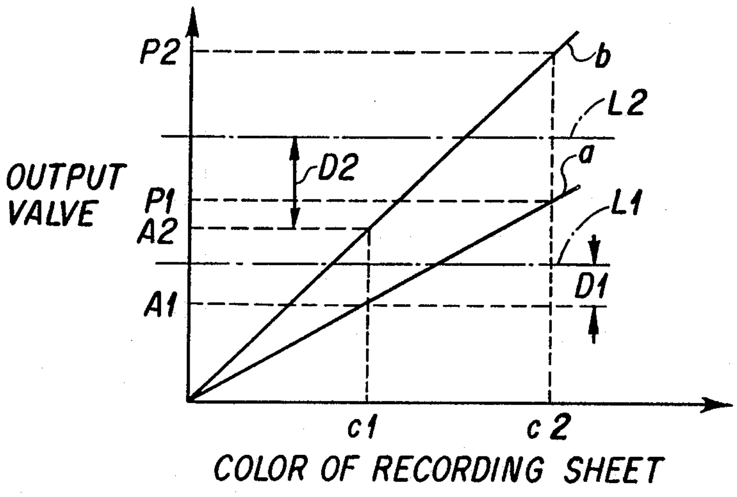
FIG. 5 is a graph explaining the function of the photo-electric sensor.

Referring to the graph of FIG. 5, there is shown the value of the output signal of the photo-electric sensor 4, wherein the value of the output signal is taken along the vertical axis, and the brightness of the color of the recording medium is taken along the horizontal axis (the color is brighter in the rightward direction of the horizontal axis).

In the case where the photo-electric sensor 4 having a sensitivity curve "a" is used, when the recording sheet 6 is absent at the predetermined position on the platen 2, the color of the surface of the platen 2 is indicated at c1 on the horizontal axis. In this condition, that is, the recording sheet 6 is absent at the predetermined position, a first output value A1 is supplied from the photo-electric sensor 4 to the reference determining means 14*a* in the reference setting mode. The reference determining means 14*a* determines a reference L1 based on the supplied first output value A1. The determined reference L1 is larger by a value D1 than the first output value A1. On the other hand, when the recording sheet 6 is present at the predetermined position, the color of the recording sheet 6 is indicated at c2 on the horizontal axis. In this condition, that is, the recording sheet 6 is present at the predetermined position, a second output value P1 is generated by the photo-electric sensor 4. Thus, in the normal operation mode or in the printing mode, the output value A1 or P1 is supplied from the photo-electric sensor 4 to the judging means 14*b*. The values A1 and P1 correspond to the presence and the absence of the recording sheet 6, respectively. Subsequently, in the printing operation the judging means 14*b* compares the thus supplied output value A1 or P1 with the reference L1 stored in the memory means 16. In the case where the supplied output value is A1, the value A1 is smaller than the reference L1. In this case, the judging means judges or determines that the recording sheet 6 is absent at the predetermined position. On the other hand, in the case where the supplied output value is P1, the value P1 is larger than the reference L1. In this case, the judging means judges or determines that the recording sheet 6 is present at the predetermined position.

In the case where the photo-electric sensor 4 having a sensitivity curve "b" is used, when the recording sheet 6 is absent at the predetermined position on the platen 2, the color of the surface of the platen 2 is indicated at c1 on the horizontal axis. In this condition, that is, the recording sheet 6 is absent at the predetermined position, a first output value A2 is supplied from the photo-electric sensor 4 to the reference determining means 14*a* in the reference setting mode. The reference determining means 14*a* determines a reference L2 based on the supplied first output value A1, the determined reference L2 being larger by a value D2 than the first output value A2. On the other hand, when the recording sheet 6 is present at the predetermined position, the color of the recording sheet 6 which is fed to the platen 2 is indicated at c2 on the horizontal axis. In this condition, that is, the recording sheet 6 is present at the predetermined position, a second output value P2 is generated by the photo-electric sensor 4. Thus, in the normal operation mode, either of the output values A2 and P2 is supplied from the photo-electric sensor 4 to the judging means 14*b*. The values A2 and P2 correspond to the presence and the absence of the recording sheet 6, respectively. The judging means 14*b* compares the thus supplied output value A2 or P2 with the reference L2 stored in the memory means 16. In the case where the supplied output value is A2, the value A2 is smaller than the reference L2. In this case, the judging means judges or determines that the recording sheet 6 is absent at the predetermined position. On the other hand, in the case where the supplied output value is P2, the value P2 is larger than the reference L2. In this case, the judging means judges or determines that the recording sheet 6 is present at the predetermined position.

Accordingly, the present apparatus incorporated in the printer is able to accurately detect the presence or absence of the recording medium at the predetermined position even if the sensitivity of the photo-electric sensor 4 varies, even if the color of the recording sheet 6 varies (provided the color or brightness is not completely the same as the color of the surface of the platen 2), and even if the relative positions of the photo-electric sensor 4 and the platen 2 vary.

While the present invention has been described in detail in its presently preferred embodiment, it is to be understood that the present invention is not limited to the details of the illustrated embodiment, but may be embodied with various changes, modifications and improvements, which may occur to those skilled in the art, without departing from the spirit and scope of the invention defined in the appended claims.

What is claimed is:

1. An apparatus for detecting the presence or absence of a recording medium in a printer in which the recording medium is fed along a feeding path, the apparatus comprising:

a rotary support member for supporting the recording medium, said support member having a surface whose reflectance of light is lower than that of the recording medium;

a photo-electric sensor disposed adjacent to a predetermined position on the surface of said support member which partially defines the feeding path of the printer, said photo-electric sensor including a light emitting element which emits light toward said surface of the support member, and a light receiving element which receives the light reflected from said surface and which generates an output signal corresponding to an intensity of the received light;

reference determining means for determining a reference based on a maximum value of said output signal which is generated by said light receiving element of said photo-electric sensor during rotation of said rotary support member by at least one turn in a reference setting mode in which the recording medium is absent at said predetermined position, said reference determining means determining said reference by adding an extra value to said maximum value of said output signal;

memory means for storing said reference determined by said reference determining means; and judging means for comparing the output signal of said photo-electric sensor with said reference in a normal operation mode, and for judging that the recording medium is present at said predetermined position if the output signal in said normal operation mode is higher than said reference.

2. An apparatus according to claim 1 further comprising:

an A/D converter means connected to said light receiving element of said photoelectric sensor for converting said output signal of said light receiving element into a digital output signal; and said reference determining means determining said reference based on a maximum value of the digital output signal supplied from said A/D converter means in said reference setting mode.

3. An apparatus according to claim 2, wherein said reference determining means determines said reference by multiplying the level of the output signal of said photo-electric sensor, generated in said reference setting mode, by $(1+\alpha)$, $\alpha$ being smaller than 1.

4. An apparatus according to claim 1, wherein said reference determining means, said memory means and said judging means are constituted by a computer, and said photo-electric sensor is connected to said computer via an A/D converter.

5. An apparatus according to claim 1, further comprising switch means for placing the printer either in said reference setting mode or in said normal operation mode.

6. An apparatus according to claim 1, wherein said support member is a feed roller which rotates while supporting the recording medium.

7. An apparatus according to claim 5, wherein said switch means includes an operation member which is operated by an operator.

* * * * *